United States Patent
Zhu et al.

(10) Patent No.: US 12,045,428 B2
(45) Date of Patent: Jul. 23, 2024

(54) TOUCH SCREEN SENSOR AND TOUCH SCREEN WITH TOUCH SCREEN SENSOR

(71) Applicant: Shenzhen Laibao Hi-Tech Co., Ltd., Guangdong (CN)

(72) Inventors: Zeli Zhu, Guangdong (CN); Wei Li, Guangdong (JP); Shimin Wang, Guangdong (CN); Xiaolai Song, Guangdong (CN); Weiyun Zhou, Guangdong (CN)

(73) Assignee: Shenzhen Laibao Hi-Tech Co., Ltd., Guangdong (CN)

( * ) Notice: Subject to any disclaimer, the term of this patent is extended or adjusted under 35 U.S.C. 154(b) by 0 days.

(21) Appl. No.: 18/270,216

(22) PCT Filed: Sep. 22, 2021

(86) PCT No.: PCT/CN2021/119670
§ 371 (c)(1),
(2) Date: Jun. 29, 2023

(87) PCT Pub. No.: WO2022/142509
PCT Pub. Date: Jul. 7, 2022

(65) Prior Publication Data
US 2024/0086019 A1      Mar. 14, 2024

(30) Foreign Application Priority Data
Dec. 30, 2020   (CN) .......................... 202011605262.2

(51) Int. Cl.
*G06F 3/041*     (2006.01)
*G06F 3/044*     (2006.01)

(52) U.S. Cl.
CPC .......... *G06F 3/0446* (2019.05); *G06F 3/0445* (2019.05)

(58) Field of Classification Search
None
See application file for complete search history.

(56) References Cited

FOREIGN PATENT DOCUMENTS

| CN | 106170751 A | 11/2016 |
|---|---|---|
| CN | 208367661 U | 1/2019 |
| CN | 110442265 A | 11/2019 |

(Continued)

OTHER PUBLICATIONS

Translation of CN-110998496-A into English; Kuriki et al. (Year: 2020).*

*Primary Examiner* — Brian M Butcher
(74) *Attorney, Agent, or Firm* — Samson G. Yu

(57) ABSTRACT

The present disclosure provides a touch screen sensor and a touch screen with the touch screen sensor. The touch screen sensor includes a plurality of grid cells, wherein the plurality of grid cells are connected to each other to form the touch screen sensor; and each grid cell includes a plurality of metal electrode wires arranged in an intersecting manner, the plurality of grid cells at least form a three-wire intersection mode at part of intersection points, and a plurality of identical grid cells are repeatedly connected or different grid cells are arranged in the intersecting manner to form a touch electrode. In some embodiments of the present disclosure, at least part of the intersection points of a four-wire intersection mode of the grid cells are adjusted and arranged to be intersection points of the three-wire intersection mode.

14 Claims, 5 Drawing Sheets

(56) References Cited

FOREIGN PATENT DOCUMENTS

| CN | 110869896 | A |   | 3/2020 |           |
|----|-----------|---|---|--------|-----------|
| CN | 110998496 | A | * | 4/2020 | G06F 3/0445 |
| CN | 111651100 | A |   | 9/2020 |           |
| CN | 112698748 | A |   | 4/2021 |           |

* cited by examiner

Prior art

TOUCH SCREEN SENSOR AND TOUCH SCREEN WITH TOUCH SCREEN SENSOR

CROSS-REFERENCE TO RELATED APPLICATION

The present disclosure claims the priority of Chinese Application No. 202011605262.2, filed in the Chinese Patent Office on Dec. 30, 2020, and entitled "Touch Screen Sensor and Touch Screen Having Same", the entire contents of which are herein incorporated by reference.

TECHNICAL FIELD

The present disclosure relates to the field of design of touch screens, and in particular, to a touch screen sensor and a touch screen having same.

BACKGROUND

In an existing touch screen of a metal grid structure, a plurality of intersecting and parallel metal electrode wires are made of metal materials such as silver, copper, and metal alloys containing silver or copper, so as to form a touch electrode in the shape of a metal grid.

At present, compared with a traditional ITO electrode, the metal materials such as silver, copper, and metal alloys containing silver or copper have the characteristics of metal reflection or opacity, which will reduce a light transmittance of the touch screen, and meanwhile form various light and dark stripes, thus affecting a visual sense of the screen.

At present, a light transmission effect is mainly achieved by using a technical solution in which wire widths of the metal electrode wires are decreased and a wire spacing between the metal electrode wires are increased. However, when the wire widths of the metal electrode wires are designed to be too small, a phenomenon of unsatisfactory touch performance will occur, the difficulty of a production process is increased, and the yield rate is decreased. If the wire widths of the metal electrode wires are designed to be too large, the light transmission performance will be poor, various metal reflective stripes will occur, and the metal electrode wires are prone to reduce the Moire interference phenomenon.

At the same time, most current electronic products are produced by matching touch screens with display screens, and the touch screen and the display screen are bonded to form an assembly screen with a touch function and a display function. In order to avoid the Moire effect, the metal electrode wires of the touch screen need to be designed to be non-parallel with the metal electrode wires of the display screen. Since the metal electrode wires in the current display screen mostly utilize a right-angle intersection design of square or rectangular matrices of the metal electrode wires, or similar structures, the metal electrode wires in the touch screen of the metal grid structure generally utilize the design of acute angles and obtuse angles, but a four-wire intersection form is utilized at an intersection point. The four-wire intersection manner in some embodiments of the present disclosure is that, with the intersection point as the center, the metal electrode wires extend outward in four directions. The metal electrode wires, which pass through the intersection point to locate on the same straight line and have opposite directions, are understood as two different metal electrode wires here.

A metal electrode wire pattern is designed on a substrate by means of an etching process, and the substrate is made of a glass or thin film material. In the etching process, when an etching solution is distributed in a dot shape, under an action of surface tension and with an etching center point as the center of a circle, circular etching areas are radiated by an etching tension. When the etching solution is distributed in a strip shape, at a middle segment, due to a mutual covering effect of the circular etching areas, the circular etching areas cannot be seen, and only part of circular arc shapes of the circular etching areas may be seen at both ends.

In the art known to inventors, as shown in FIG. 1, in order to avoid the Moire interference phenomenon, intersection angles between a plurality of metal electrode wires are acute angles and obtuse angles, and in order to reduce the Moire interference and improve the light transmittance, the wire widths of the metal electrode wires in the art known to inventors are generally less than 5 microns. Therefore, acute-angle grid intersection points of the metal electrode wires and the metal electrode wires are easily etched to fracture in the vicinity, resulting in defective products. In order to show the etching fracture phenomenon of the metal electrode wires, the metal electrode wires are enlarged in the figures.

In order to avoid the above problem, as shown in FIG. 2, when it is ensured that the grid intersection points are not etched to fracture, the grid intersection points of the metal electrode wires and the metal electrode wires are protected during photoetching and etching processes, resulting in an expansion phenomenon, such that the etching fracture problems of the intersection points of the metal electrode wires are reduced. In order to represent the expansion phenomenon, an expansion effect of the intersection points of metal grids in the drawings is exaggerated. However, after the intersection points expand, a pattern that is obviously greater than the wire widths of the metal electrode wires is formed, such as a circle-like, square-like, or rhombus-like pattern. The length and width or a diameter of an intersection point pattern is 7-30 microns, so that the intersection points and the metal electrode wires in other areas form obvious visual differences, which forms a large number of starry sky shapes, thus affecting the visual effect.

The introduction in the above background art is only for the convenience of better understanding technical problems to be solved by the present disclosure and technical solutions to be utilized, but it cannot be considered that all the technical solutions described in the above background art are prior arts. That is, some technical solutions in the background art may also constitute specific embodiments or components of the technical solutions of the present disclosure.

SUMMARY

In order to solve the above technical problems, some embodiments of the present disclosure provide a touch screen sensor and a touch screen with the touch screen sensor, so as to solve the problems in the art that a metal grid touch screen is prone to reduce moire interference, and that grid intersection points of metal electrode wires are etched to fracture. At the same time, some embodiments of the present disclosure may also control the square resistance of each area of the touch screen, and achieve an ideal light transmission effect.

In order to achieve the above purpose, some embodiments of the present disclosure provide a touch screen sensor, including: a plurality of grid cells, wherein the plurality of grid cells are connected to each other to form the touch screen sensor; and each grid cell includes a plurality of metal electrode wires arranged in an intersecting manner, the plurality of grid cells at least form a three-wire intersection mode at part of intersection points, and the three-wire intersection mode is that with the intersection point as a center, the metal electrode wires extend outward in three directions. A plurality of identical grid cells are repeatedly connected or different grid cells are arranged in the intersecting manner to form a touch electrode.

It should be illustrated that: in some embodiments, the metal electrode wires, which pass through the intersection point to locate on the same straight line and have opposite directions, are understood as two different wires here.

In the present disclosure, at least part of the intersection points of a four-wire intersection mode of the grid cells are adjusted and provided to be intersection points of the three-wire intersection mode. On the premise of ensuring that the metal electrode wires in the vicinity of the intersection points are not etched to fracture, smaller intersection point patterns may be fabricated in the three-wire intersection mode than the four-wire intersection mode, such that the visual difference between the intersection points and the metal electrode wires in other areas is weakened, a starry sky shape is weakened, and the visual effect is thus improved.

The etching fracture phenomenon mentioned here is represented as: when a metal material that is not protected by photoresist is removed by etching technology, so as to obtain metal electrode wires, an etching solution will form, under the action of surface tension, an arc-like surface on a contact surface with an etched metal, but due to the relatively small wire widths of the metal electrode wires, some metal electrode wires just fall into the circular arc of the tension, and the metal electrode wires are prone to complete fracture. When the wire widths are relatively large, some metal electrode wires may be etched, but do not completely fracture. Since the three-wire intersection mode has one less metal electrode wire than the four-wire intersection mode, an included angle between the metal electrode wires becomes larger, thereby reducing the risk of etching fracture of the metal electrode wires.

At the same time, since most metal electrode wires in the display screen known to inventors utilize a right-angle intersection design of square or rectangular matrices of the metal electrode wires, or similar structures, that is, the four-wire intersection mode design is utilized in general. In some embodiments of the present disclosure, when a metal grid touch screen in the three-wire intersection mode is bonded with a display screen to form an assembly screen with a touch function and a display function, the probability of forming regularity between the metal electrode wires of the touch screen and the metal electrode wires of the display screen is reduced, and the Moire effect is reduced.

In some embodiments, the intersection modes at the intersection points of the grid cells are all provided to be the three-wire intersection mode.

In some embodiments, a solution at least having an acute angle and an obtuse angle is utilized between the metal electrode wires in the three-wire intersection mode, that is, the metal electrode wires intersect to form a grid cell of a rhombus structure, thereby avoiding obvious Moire fringes between the metal electrode wires of square or rectangular or square-like or rectangular-like structures of the display screen.

It should be noted that, the rhombus in some embodiments of the present disclosure is not necessarily a completely regular rhombus structure, but may be slightly different from a regular rhombus structure, for example, the four sides of the rhombus are not completely straight lines, but curves in the form of tiny waves, such that a rhombus-like structure is formed. The curve is also used for avoiding the obvious Moire fringes between the square or rectangular linear metal electrode wires of the display screen.

In some embodiments, an included angle between the metal electrode wires in the three-wire intersection mode is a first included angle, three first included angles may be formed, the first included angles are provided to be acute angles and obtuse angles, and sometimes, may be a right angle or a flat angle of 180°, but there is at least one acute angle. Due to the existence of the acute angle, the formation of rules such as a parallel relationship between the metal electrode wires of the touch screen and the metal electrode wires of the display screen are reduced, and the Moire interference phenomenon between the metal electrode wires of the touch screen and the metal electrode wires of the display screen is greatly alleviated.

In some embodiments, the intersection point of the metal electrode wires is a metal pattern with a length and width or a diameter of 7-10 microns, so as to increase the strength of an electrical connection between the various metal electrode wires, and to prevent the acute-angle intersecting metal electrode wires in the vicinity of the grid intersection point from being etched to fracture. When a metal electrode wire pattern is designed, the acute-angle intersecting metal electrode wires in the vicinity of the grid intersection point are closer to an etching solution than oblique-angle intersecting metal electrode wires in the vicinity of the intersection point, and thus are etched to fracture by the etching solution easily. At the same time, there is no obvious optical difference between the intersection point of the metal electrode wires and other areas of the metal electrode wires.

In some embodiments, there is at least one first included angle between the metal electrode wires, of which an intersection angle is an acute angle of 50-70°. Since the degree of the acute angle is increased, under the condition of ensuring the alleviation of Moire interference, the etching fracture of the acute-angle intersecting metal electrode wires in the vicinity of the grid intersection points is reduced.

In some embodiments of the present disclosure, the metal electrode wires in the vicinity of the intersection point is twisted to a certain extent, so that the difference with the grid cell of a regular rhombus structure lies in that: there is an intersection angle at the intersection point, and the intersection angle at the intersection point a second included angle, the second included angle is arranged to be a right angle, or the angle is close to a right angle, that is, the metal electrode wires intersect to form a grid cell similar to a rhombus structure, but there is an included angle close to a right angle at the intersection point. The specific arrangement of this solution will be described in conjunction with the drawings and specific embodiments.

In some embodiments, the wire width size of at least part of wire segments of the metal electrode wire gradually decreases or increases along an extension direction of the wire segments. Specifically, the wire width size refers to the wire width size of the metal electrode wire, it is convenient to adjust a square resistance value of an area where each grid cell is located due to such settings, an area with a large wire width has small resistance, and an area with a small wire width has large square resistance. By adjusting the square resistance of the area of each grid cell, customized touch performance of the touch screen is realized, such that the application range of touch screen is improved. The embodiments may also reduce the formation of rules between the metal electrode wires of the touch screen and the metal electrode wires of the display screen to a certain extent.

In some embodiments, a gradually increasing wire width of the metal electrode wire is 6 to 9 microns, and a gradually decreasing wire width of the metal electrode wire is 2 to 3.5 microns.

Some embodiments of the present disclosure further provide a touch screen, including a substrate, and a first touch electrode layer arranged on the substrate, wherein an insulating layer is arranged on the first touch electrode layer, a side of the insulating layer away from the first touch electrode layer is provided with a second touch electrode layer, the first touch electrode layer and the second touch electrode layer each has several touch electrode channels, projections of the upper and lower layers of touch electrode channels on the substrate form an intersection relationship, and the touch electrode channel includes the above touch screen sensor.

By applying the technical solutions of some embodiments of the present disclosure, the touch screen sensor includes a plurality of grid cells that are connected to each other, the grid cell includes a plurality of metal electrode wires arranged in an intersecting manner, and at least part of intersection points of the metal electrode wires are set in the three-wire intersection mode, thereby not only the risk of etching fracture of the intersection points is reduced, and the problem of the touch screen sensor in the art known to inventors generating Moire interference easily can also be alleviated.

BRIEF DESCRIPTION OF THE DRAWINGS

The drawings constituting a part of the present disclosure are used for providing a further understanding of the present disclosure, and exemplary embodiments of the present disclosure and descriptions thereof are used for explaining the present disclosure, but do not constitute improper limitations of the present disclosure. In the drawings.

The above drawings include the following reference signs:

1. grid cell; 10. metal electrode wire; 20. intersection point; 30. twist point; 100. substrate; α. first included angle; β. second included angle; 11. first wire segment; 12. second wire segment; 101. first touch electrode layer; 102. insulating layer; 103. second touch electrode layer; 1011. first touch electrode channel; 1012. virtual touch electrode.

DETAILED DESCRIPTION OF THE EMBODIMENTS

It should be illustrated that, if there is no conflict, embodiments in the present disclosure and features in the embodiments may be combined with each other. Hereinafter, the present disclosure will be described in detail with reference to the drawings and in conjunction with the embodiments.

It should be noted that, the terms used here are only for describing specific embodiments, and are not intended to limit the exemplary embodiments according to the present disclosure. As used herein, unless the context clearly indicates otherwise, a singular form is also intended to include a plural form. In addition, it should also be understood that, when the terms "comprising" and/or "including" are used in this specification, they indicate the presence of features, steps, operations, devices, components, and/or combinations thereof.

It should be illustrated that, the terms "first" and "second" and the like in the specification, claims and the above-mentioned drawings of the present disclosure are used for distinguishing similar objects, and are not necessarily used for describing a specific sequence or precedence order. It should be understood that the data used in this way may be interchanged under appropriate circumstances, so that the embodiments of the present disclosure described herein may be implemented in a sequence other than those illustrated or described herein. Furthermore, the terms "including" and "having", and any variations thereof are intended to cover non-exclusive inclusions, for example, processes, methods, systems, products or devices including a series of steps or units are not necessarily limited to those clearly listed steps or units, but may include other steps or units that are not clearly listed or are inherent to these processes, methods, products or devices.

Please refer to FIG. 3 to FIG. 6, some embodiments of the present disclosure provide a touch screen sensor.

Figure 1:
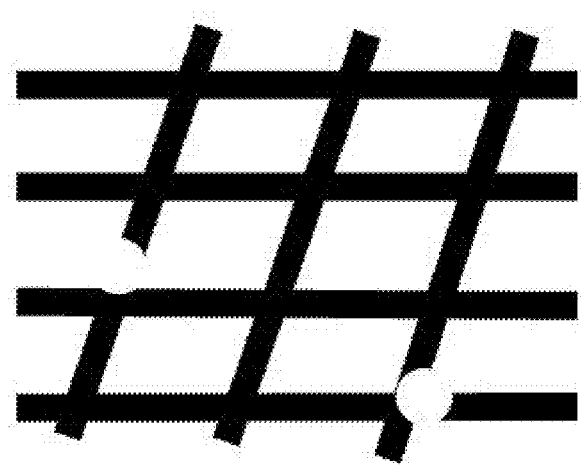
FIG. 1 shows a schematic structural diagram of a first embodiment of an existing touch screen sensor.
Figure 2:
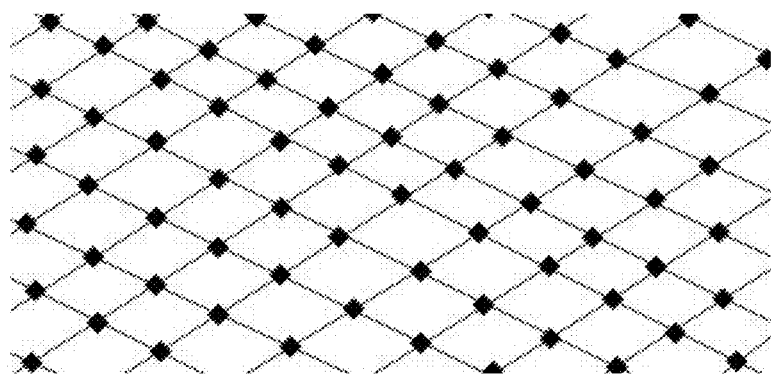
FIG. 2 shows a schematic structural diagram of a second embodiment of the existing touch screen sensor.
Figure 3:
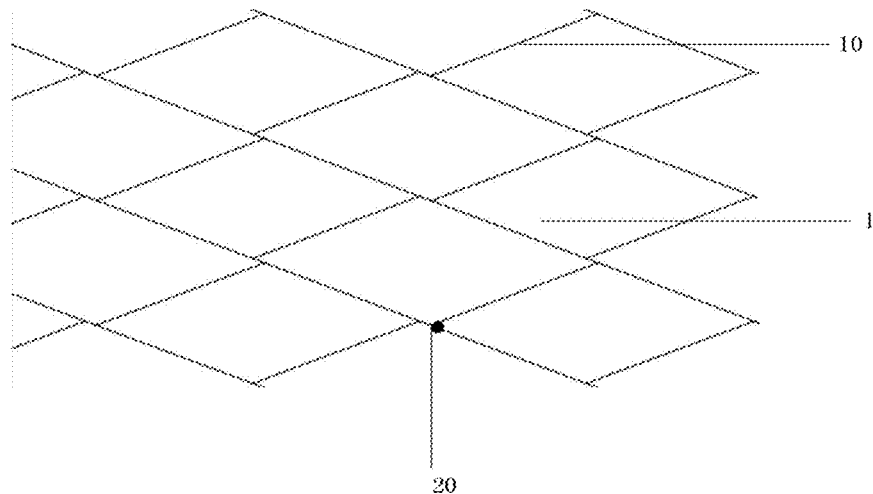
FIG. 3 shows a schematic structural diagram of a first embodiment of a touch screen sensor of the present disclosure.

As shown in FIG. 3, the touch screen sensor of the present disclosure includes: a plurality of grid cells 1, wherein the plurality of grid cells 1 are connected to each other to form the touch screen sensor; and each grid cell 1 includes a plurality of metal electrode wires 10 arranged in an intersecting manner, and the plurality of grid cells 1 at least form a three-wire intersection mode at part of intersection points 20. Multiple identical grid cells are repeatedly connected or different grid cells are arranged in the intersecting manner to form a touch electrode.

In the embodiment shown in FIG. 3, two metal electrode wires 10 that pass through the intersection point 20 are in two opposite directions on a same straight line. This design is conducive to forming at least one acute angle among three intersecting metal electrode wires 10, such that Moire interference fringes are reduced. In other embodiments, the three metal electrode wires 10 that pass through the intersection point 20 may not coexist on any straight line.

In the embodiment shown in FIG. 3, all the metal electrode wires 10 are provided in the three-wire intersection mode at the intersection points 20. In other embodiments, some may be provided in the three-wire intersection mode, and some may be provided in a four-wire intersection mode.

In the embodiment shown in FIG. 3, the plurality of metal electrode wires 10 are connected in an intersecting manner so as to at least form a quadrilateral structure, and the quadrangle has two acute angles. Since grid lines of a display screen mostly form right angles, the metal grids of the touch screen forming acute angles may alleviate the Moire problem. In other embodiments, some quadrangle may have at least one acute angle, but not necessarily two acute angles.

Figure 4:
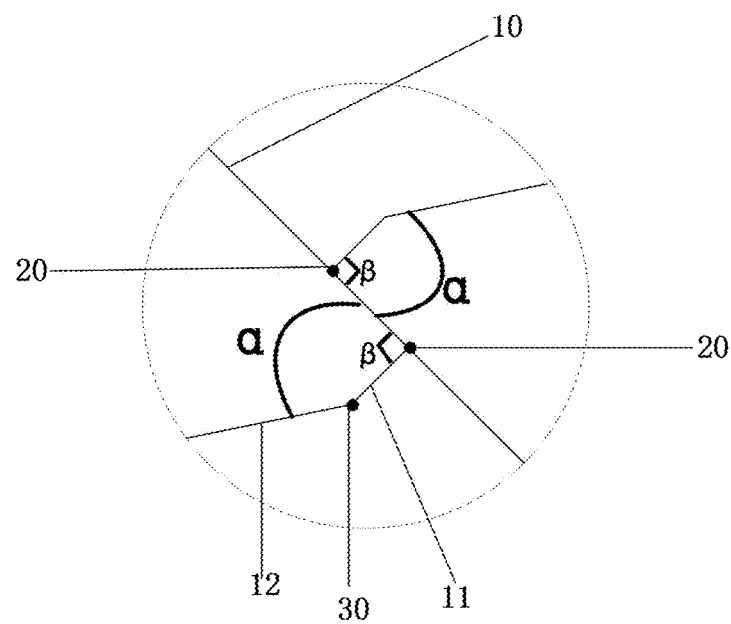
FIG. 4 shows a schematic structural diagram of a second embodiment of the touch screen sensor of the present disclosure.
Figure 5:
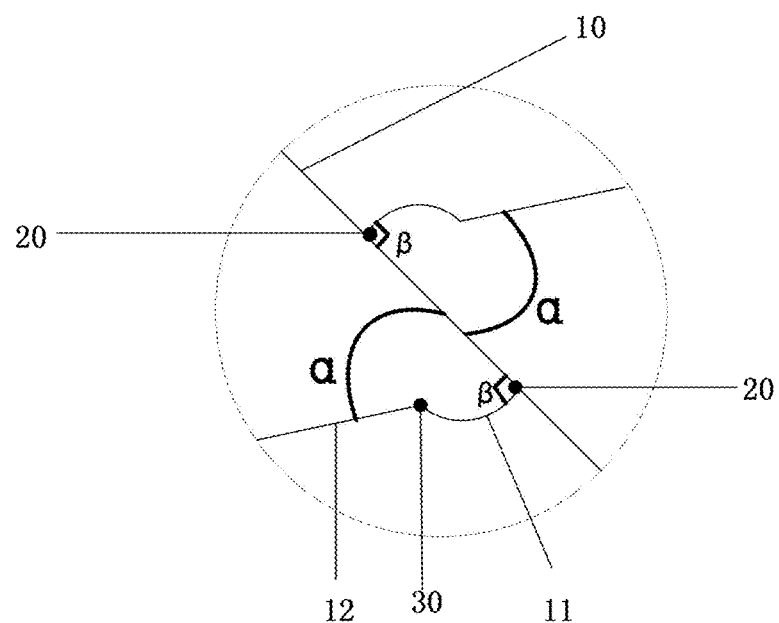
FIG. 5 shows a schematic structural diagram of a third embodiment of the touch screen sensor of the present disclosure.

As shown in FIG. 4 and FIG. 5, in some embodiments, the intersections between the plurality of metal electrode wires 10 of the grid cell 1 have three first included angles α, and the first included angles α include acute angles and obtuse angles, which have an angle sum of 360°. In some other embodiments, there may also be a right angle or a flat angle of 180°, but there is at least one acute angle, wherein the degree of the acute angle is 10° to 80°. Due to the existence of the acute angle, the formation of rules such as a parallel relationship between the metal electrode wires of the touch screen and the metal electrode wires of the display screen are reduced, and the Moire interference phenomenon between the metal electrode wires of the touch screen and the metal electrode wires of the display screen is greatly alleviated. In the present embodiment, only an embodiment with a flat angle of 180°, an acute angle and an obtuse angle is shown. In other embodiments, the three first included angles α may include one acute angle and two obtuse angles, or one acute angle, one obtuse angle and a right angle, or two acute angles and one obtuse angle.

In some embodiments, the degree of the acute angle in the first included angles α is 50° to 70°, which may prevent the metal electrode wires from being etched to fracture to the greatest extent under a condition of reducing the Moire fringes.

In some other solutions, there is a solution in which the three first included angles α are all obtuse angles. This solution is not a technical solution to be described in the present disclosure. This solution is conducive to preventing etching fracture, however, on the premise of reducing the Moire fringes and having the same density of the metal electrode wires, the resistance increases, which is not conducive to improving the touch performance. Therefore, this solution is only a disclosure of the existing possible technical solutions, so as to better understand the embodiments of the present disclosure.

In the embodiments shown in FIG. 4 and FIG. 5, in order to avoid etching fracture, in two metal electrode wires 10 that intersect to form an acute angle, a twist point 30 is arranged at a certain distance away from the intersection point 20 in the vicinity of the intersection point 20 of at least one of the metal electrode wires 10, so as to perform a twist design, a distance between the twist point 30 and the intersection point 20 is 20-100 microns, such that at least one of the metal electrode wires 10 has a first wire segment 11 and a second wire segment 12, one end of the first wire segment 11 is connected with the intersection point 20, the other end of the first wire segment 11 is connected with the second wire segment 12, the first wire segment 11 extends along a first predetermined direction, and the second wire segment 12 extends along a second predetermined direction, wherein the acute included angle between the second wire segment 12 and the other metal electrode wire 10 or the second wire segment 12 of the other metal electrode wire 10 is regarded as the first included angle α between the two metal electrode wires 10. In some embodiments, the included angle between the first wire segment 11 and the other metal electrode wire 10 or the first wire segment 11 of the other metal electrode wire 10 is a second included angle β, and the second included angle β is greater than the first included angle α.

It should be illustrated that, in the embodiment of the present disclosure, the twist point 30 is a connection point between the first wire segment 11 and the second wire segment 12. As shown in FIG. 4, when the first wire segment 11 is a straight line, the first predetermined direction is an extension direction of the first wire segment 11; and as shown in FIG. 5, when the first wire segment 11 is a curve, the first predetermined direction includes a tangential direction of the intersection point between the first wire segment 11 and the other metal electrode wire 10 in the two metal electrode wires, or a tangent direction of the intersection point between the first wire segment 11 and the first wire segment 11 of the other metal electrode wire 10 in the two metal electrode wires.

In some embodiments, the second included angle β is 80° to 120°.

In one embodiment, the second included angle β is 90°, and 90° is the embodiment shown in FIG. 4 and FIG. 5, which may better avoid etching fracture.

In other embodiments, it is not necessarily designed to be 90°. In the embodiment of the present figure, only one metal electrode wire 10 of the two metal electrode wires 10 that forms the acute angle is twisted. In some embodiments, the two metal electrode wires 10 that forms the acute angle both are twisted.

Figure 6:
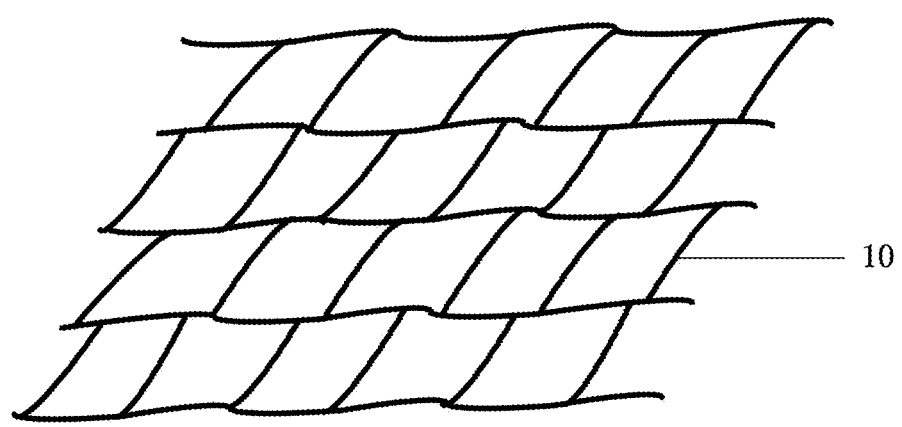
FIG. 6 shows a schematic structural diagram of a fourth embodiment of the touch screen sensor in the present disclosure.

As shown in FIG. 6, the metal electrode wires 10 provided in the present embodiment are arranged to intersect each other, a single metal electrode wire 10 does not extend completely linearly, but extends in a wave form so as to form a regular or irregular grid cell 1, and the wavy extension of the metal electrode wires 10 and the irregular grid cell 1 both may greatly alleviate the Moire interference between the metal electrode wires 10. In the embodiment shown in FIG. 6, the wave of the metal electrode wire 10 is relatively gentle, and in other embodiments, the wave may have a steeper slope.

Figure 7:
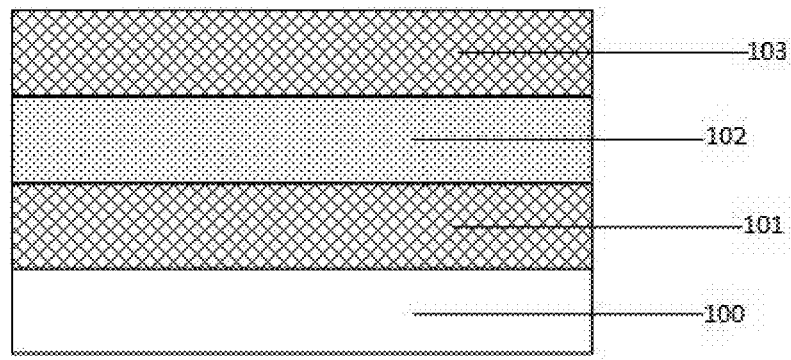
FIG. 7 shows a schematic structural diagram of a touch screen in some embodiments of the present disclosure.

As shown in FIG. 7, some embodiments of the present disclosure further provide a touch screen. The touch screen includes a substrate 100 and a first touch electrode layer 101 arranged on the substrate 100, wherein an insulating layer 102 is arranged on a side of the first touch electrode layer 101 away from the substrate 100, a side of the insulating layer 102 away from the first touch electrode layer 101 is provided with a second touch electrode layer 103, the first touch electrode layer 101 and the second touch electrode layer 103 each has several touch electrode channels, projections of the upper and lower layers of touch electrode channels on the substrate form an intersection relationship, and each touch electrode channel includes the above touch screen sensor.

Figure 8:
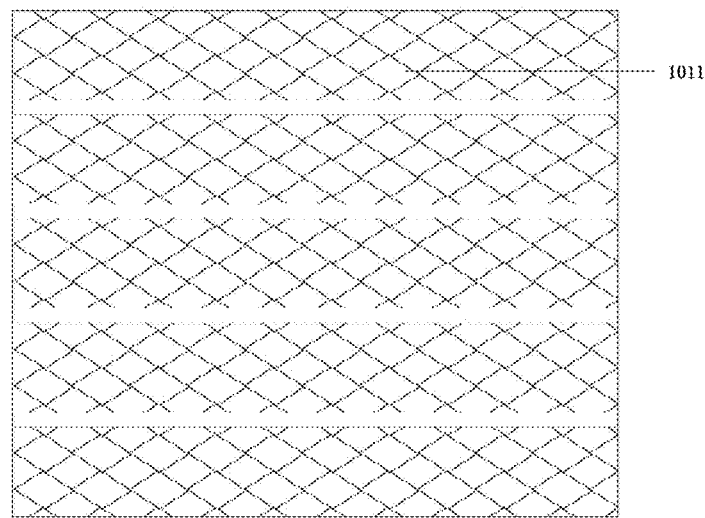
FIG. 8 shows a schematic structural diagram of a first embodiment of a first touch electrode layer of the present disclosure.

As shown in FIG. 8, it is a first schematic structural diagram of the first touch electrode layer 101 of an embodiment of the present disclosure, the first touch electrode layer 101 includes several electrically isolated first touch electrode channels 1011, and each first touch electrode channel 1011 is connected with a drive control circuit.

Figure 9:
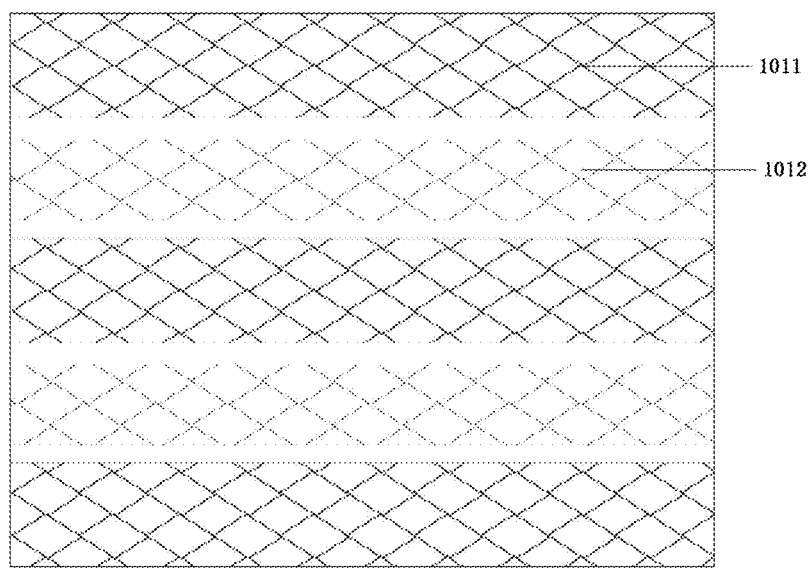
FIG. 9 shows a schematic structural diagram of a second embodiment of the first touch electrode layer in the present disclosure.

As shown in FIG. 9, it is a second schematic structural diagram of the first touch electrode layer 101 of an embodiment of the present disclosure, the first touch electrode layer 101 includes several electrically isolated first touch electrode channels 1011, the several electrically isolated first touch electrode channels 1011 are separated by virtual touch electrodes 1012, each first touch electrode channel 1011 is connected with the drive control circuit, the virtual touch electrodes 1012 only have an optical matching effect, and the virtual touch electrodes 1012 are not connected to the drive control circuit.

In some embodiments, many breakpoints are provided in each virtual touch electrode 1012 for separating the metal electrode wires.

In some embodiments, breakpoints are provided in the first touch electrode channel 1011, but the number of breakpoints in the first touch electrode channel 1011 is less than the number of breakpoints in the virtual touch electrode 1012.

The second touch electrode layer 103 includes a second touch electrode channel, and may also have a virtual touch electrode, which will not be repeated herein.

In the touch screen sensor of some embodiments of the present disclosure, changes in the square resistance of different areas are realized by changing the designed wire widths, such that the breakpoints in the metal electrode wires are reduced (most prior arts adjust the changes in the square resistance of the areas of the grid cells by designing the breakpoints), excessive breakpoints will lead to the appearance of metal electrode wires that are completely electrically isolated in all directions, these completely isolated metal electrode wires have no charge release channel, thereby being prone to static electricity accumulation, which causes an electrostatic damage to the touch screen, and some embodiments of the present disclosure may also effectively alleviate this problem.

Of course, in other solutions, there is a design in which the projections of the metal electrode wires of the display screen and the touch screen completely overlap on an observation surface, this design can not only avoid the Moire interference, and but can also increase the light transmittance of the assembly screen. However, the display screen and the touch screen each has its own special design requirements, therefore it is difficult to achieve a consistent design of metal grid electrode wires. Such an ideal design is difficult to be realized in production practice. This solution is not a technical solution to be described in the present disclosure, and is only for a disclosure of the existing possible technical solutions, so as to better understand the present disclosure.

For the convenience of description, spatially relative terms, such as "on", "above", "on the surface", "over" and the like, may be used herein to describe spatial position relationships between one device or feature and other devices or features shown in the figures. It should be understood that, the spatially relative terms are intended to include different orientations of the device in use or operation in addition to the orientations described in the figures. For example, if the device in the figures is turned over, the device, which is described as "above other devices or structures" or "over other devices or structures" would then be positioned as "below other devices or structure" or "beneath other devices or structure". Thus, the exemplary term "above" may include both orientations of "above" and "below". The device may also be otherwise positioned (rotated by 90 degrees or at other orientations), and the spatially relative descriptions used herein are interpreted accordingly.

The above descriptions are only some embodiments of the present disclosure, and are not intended to limit the present disclosure. For those skilled in the art, the present disclosure may have various modifications and changes. Any modifications, equivalent replacements, improvements and the like, made within the spirit and principle of the present disclosure, shall be included within the protection scope of the present disclosure.

What is claimed is:

1. A touch screen sensor, comprising: a plurality of grid cells, wherein the plurality of grid cells are connected to each other; and each grid cell comprises a plurality of metal electrode wires arranged in an intersecting manner, the plurality of grid cells at least form a three-wire intersection mode at part of intersection points; and three first included angles $\alpha$ are formed by an intersection relationship among the plurality of metal electrode wires, and there is at least one acute angle among the three first included angles $\alpha$;

wherein in two metal electrode wires that intersect to form the acute angle, a twist point is designed in a vicinity of the intersection point of at least one of the two metal electrode wires, so as to perform a twist design, such that at least one of the metal electrode wires has a first wire segment and a second wire segment, one end of the first wire segment is connected with the intersection point, the other end of the first wire segment is connected with the second wire segment, the first wire segment extends along a first predetermined direction, the second wire segment extends along a second predetermined direction, an included angle between the first wire segment and the other metal electrode wire in the two metal electrode wires or a first wire segment of the other metal electrode wire in the two metal electrode wires is a second included angle $\beta$, and the second included angle $\beta$ is greater than the first included angle $\alpha$; wherein a distance between the twist point and the intersection point is 20 to 100 microns.

2. The touch screen sensor as claimed in claim 1, wherein a degree of the acute angle among the three first included angles $\alpha$ is 50° to 70°.

3. The touch screen sensor as claimed in claim 1, wherein the plurality of metal electrode wires are connected in an intersecting manner, so as to at least form a quadrilateral structure.

4. The touch screen sensor as claimed in claim 1, wherein the second included angle $\beta$ is 80° to 120°.

5. The touch screen sensor as claimed in claim 1, wherein the each metal electrode wire extends in a wave form.

6. The touch screen sensor as claimed in claim 1, wherein a wire width size of at least part of wire segments of the each metal electrode wire gradually decreases or increases along an extension direction of the wire segments.

7. A touch screen, comprising a substrate, and a first touch electrode layer arranged on the substrate, wherein an insulating layer is arranged on a side of the first touch electrode layer away from the substrate, a side of the insulating layer away from the first touch electrode layer is provided with a second touch electrode layer, the first touch electrode layer and the second touch electrode layer each has several touch electrode channels, and projections of an upper and lower layers of touch electrode channels on the substrate form an intersection relationship; and each touch electrode channel comprises the touch screen sensor as claimed in claim 1.

8. The touch screen as claimed in claim 7, wherein the first touch electrode layer comprises several electrically isolated first touch electrode channels, and each first touch electrode channel is connected with a drive control circuit.

9. The touch screen as claimed in claim 8, wherein the several electrically isolated first touch electrode channels are separated by virtual touch electrodes, the virtual touch electrodes only have an optical matching effect, and the virtual touch electrodes are not connected to the drive control circuit.

10. The touch screen as claimed in claim 7, wherein a degree of the acute angle among the three first included angles $\alpha$ is 50° to 70°.

11. The touch screen as claimed in claim 7, wherein the plurality of metal electrode wires are connected in an intersecting manner, so as to at least form a quadrilateral structure.

12. The touch screen as claimed in claim 7, wherein the second included angle β is 80° to 120°.

13. The touch screen as claimed in claim 7, wherein the each metal electrode wire extends in a wave form.

14. The touch screen as claimed in claim 7, wherein a wire width size of at least part of wire segments of the each metal electrode wire gradually decreases or increases along an extension direction of the wire segments.

* * * * *